DOCUMENT COLOR ANALYZING APPARATUS INCLUDING TWO DETECTORS

Filed Jan. 10, 1966 2 Sheets-Sheet 1

INVENTOR.
ARTHUR A. BERUBE
BY
Blum, Moscovitz, Friedman, Blum & Kaplan
ATTORNEYS

DOCUMENT COLOR ANALYZING APPARATUS INCLUDING TWO DETECTORS

Filed Jan. 10, 1966 2 Sheets-Sheet 2

INVENTOR.
ARTHUR A. BERUBE

BY

Blum, Moscovitz, Friedman, Blum & Kaplan

ATTORNEYS

United States Patent Office 3,497,304

Patented Feb. 24, 1970

3,497,304

DOCUMENT COLOR ANALYZING APPARATUS INCLUDING TWO DETECTORS

Arthur A. Berube, Nyack, N.Y., assignor to Arcs Industries, Inc., Bronx, N.Y., a corporation of New York Filed Jan. 10, 1966, Ser. No. 519,730

Int. Cl. G01j 3/50

U.S. Cl. 356—178 5 Claims

ABSTRACT OF THE DISCLOSURE

An object recognizing apparatus having photosensitive means for detecting light reflected from one area of an object to determine the ratio of reflected light having a preselected wave length to reflected light having wave lengths other than said preselected wave length, signal means in circuit with said photosensitive means for providing a ratio signal representative of said detected ratio, and means for providing a recognition signal indicative of whether said ratio signal lies within preselected limits.

The present invention is related generally to apparatus for analyzing objects and more particularly to apparatus for determining the character of an object by analyzing the optical properties of a particular object under consideration.

Apparatus for identifying the optical characteristics of objects has particular importance in its application to the task of determining the denomination and authenticity of printed documents such as paper currency. The specific system described herein as embodying the principles and novel features of the present invention, although directed to the identification of the denomination and authenticity of paper currency, is equally applicable to other types of objects, such as printed documents and securities' certificates. The importance of apparatus capable of identifying the authenticity of paper currency can be readily appreciated in view of the tremendous growth of the automatic vending machine industry in which the vending machines have been limited in utility since they generally accept only coins and consequently place a serious limitation on the maximum value of products which may be dispensed thereby.

It has been found that one of the most reliable methods by which to recognize the authenticity of a document such as paper currency and which is less likely to be deceived by counterfeiting lies in the suitable analysis of the color content of various portions of the document under consideration.

It is therefore an object of the present invention to provide a simple and reliable object recognizing apparatus which is operative to recognize the identity of a particular object and determine its authenticity.

It is a further object of the present invention to provide object recognizing apparatus, which is operative to sense and analyze the color content of the surface area of an object to thereby determine its identity and authenticity.

In accordance with the principles of the present invention there is provided a light source for illuminating an object to be recognized. Photosensitive means are positioned in optical alignment with the light reflected from the object to detect the reflected light and determine the ratio of light therefrom having a preselected wavelength with light therefrom having wavelengths other than said preselected wavelength. Signal means are connected to the photosensitive means to provide a ratio signal in response thereto which is representative of the ratio detected by the photosensitive means and means are connected to the output of the signals to provide a recognition signal indicative of whether the ratio signal lies within preselected limits which correspond to the allowable color content limits of the object.

The features of the present invention which are believed to be novel are set forth with particularity in the appended claims. The invention, itself, however, both as to its organization and method of operation, together with further objects and features thereof may best be understood by reference to the following description taken in conjunction with the accompanying drawings wherein:

Figure 1:
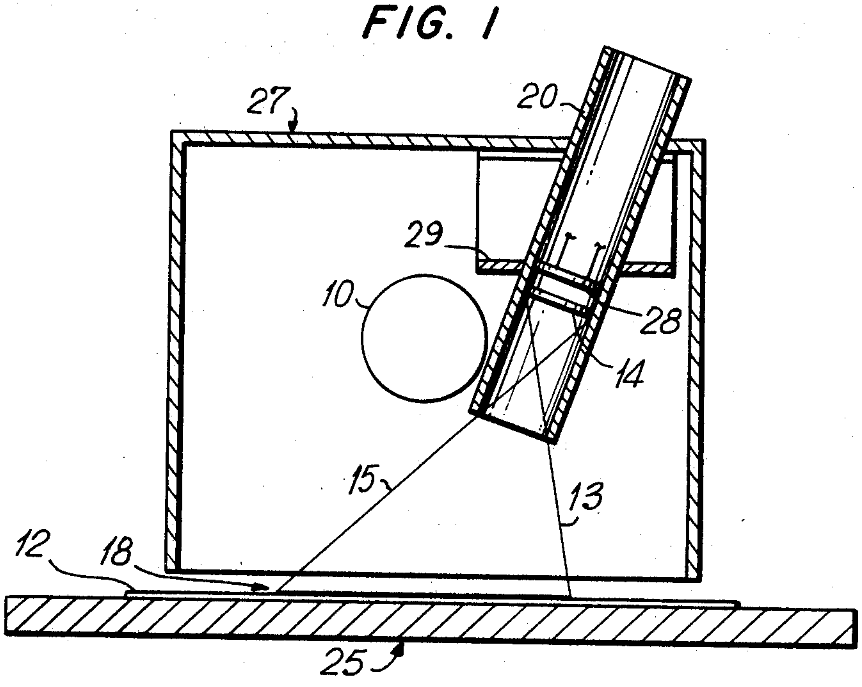
FIG. 1 shows the arrangement of one embodiment of the present invention, of the photosensitive color detection portion thereof as applied, by way of example, to the examination of paper currency.
Figure 2:
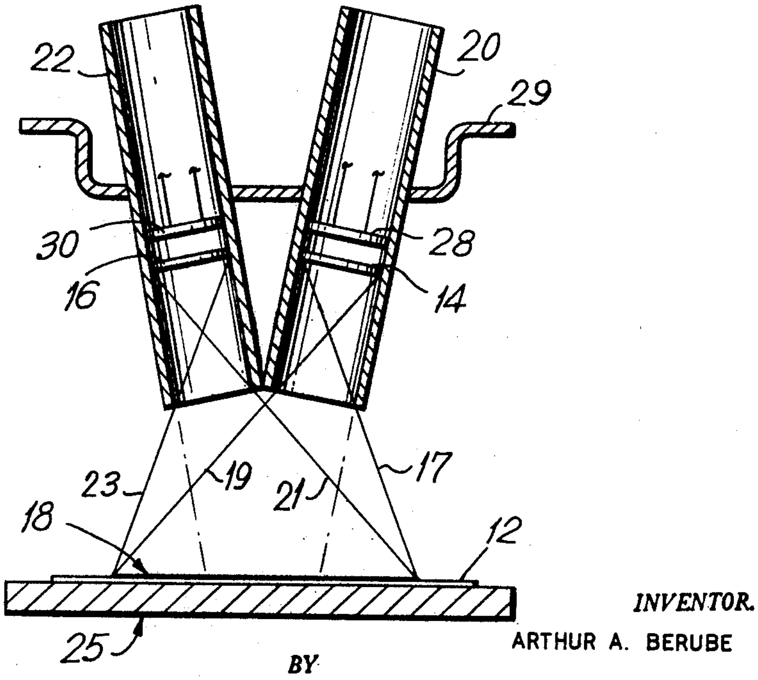
FIG. 2 shows another view of the apparatus shown in FIG. 1.

Referring to FIGS. 1 and 2 there is shown a document 12 which is suitably positioned on the surface of a platform 25 so that the light rays emanating from source 10 are incident on the area of document 25 under consideration. A fluorescent white light source 10 is located in close proximity and above the central area of document 12 under examination, such as a dollar bill, by way of example. The light rays which are reflected from the surface of document 12 are indicated generally by boundary light rays 13, 15, 17 and 19, which are directed to filter 14 and rays 21 and 23 which are directed to filter 16. Filter 14 is operative to pass only light of a preselected wavelength while blocking light of all other wavelengths and filter 16 blocks light of that preselected wavelength passed by filter 14 while passing light of all other wavelengths. The particular preselected wavelength which is characteristic of filters 14 and 16 will depend on the color content of the document under examination and the color of interest therein. The angular orientation of filters 14 and 16 is determined by the area 18 of document 12 which is generally indicated by boundary rays 13, 15, 17 and 23, and which is being examined for color content.

A pair of similar photocells 28 and 30 are disposed in brass tubes 20 and 22 respectively in optical alignment with filters 14 and 16 and are operative to detect the light energy passing through filters 14 and 16 respectively. Tubes 20 and 22 are secured in position by bracket 29 which is mounted in a suitable housing 27. Photocells 28 and 30 typically comprise cadmium sulphide surfaced areas which when exposed to a source of light energy are responsive thereto to vary their electrical resistivity inversely with the intensity of the light rays impinging thereon. Thus, photocells 28 and 30 provide electrical signals representative of the light energy passing through filters 14 and 16 respectively. The respective electrical signal outputs of photocells 28 and 30 are compared to provide a ratio signal which is applied to a control circuit as hereinafter described which is operative to actuate indicator means in response thereto, thereby indicating whether the ratio of the photocell signal outputs lies within preselected limits which correspond to the allowable color content limits of the document. The interior walls 24 and 26 of brass tubes 20 and 22 are coated with a non-reflective or black substance to eliminate the possibility that extraneous reflected light emanating from outside of the area under examination is being fed to the filter and photocell.

In actual operation, when document 12 is located under light source 10 as shown in FIG. 1, light reflected therefrom impinges on photocells 28 and 30 after passing through filters 14 and 16. Thus, if it is desired to detect the color properties of a dollar bill, filter 14 would typically constitute a positive green filter and filter 16 a negative green filter. Referring to FIGURE 2, it will be noted that the optical look angles of photocells 28 and 30 which are defined by light rays 17 and 19, and 21 and 23 respectively overlap at area 18. Thus, photocells 28 and 30 examine a common area 18 to measure, in the case of a dollar bill, the white and green color content of area 18 which serves to determine the denomination and also the authenticity of the bill. If the combined signal produced by photocells 28 and 30 falls outside of the preselected limits, a signal is produced, as hereinafter described, which indicates that the submitted bill is unacceptable. It is understood that the type of light detection elements shown in FIGURES 1 and 2 to comprise photocells, the optical look angle of photocells 28 and 30, and the type of optical filters 14 and 16 may, individually or in combination, be suitably varied in accordance with the type of object or document under examination.

Figure 3:
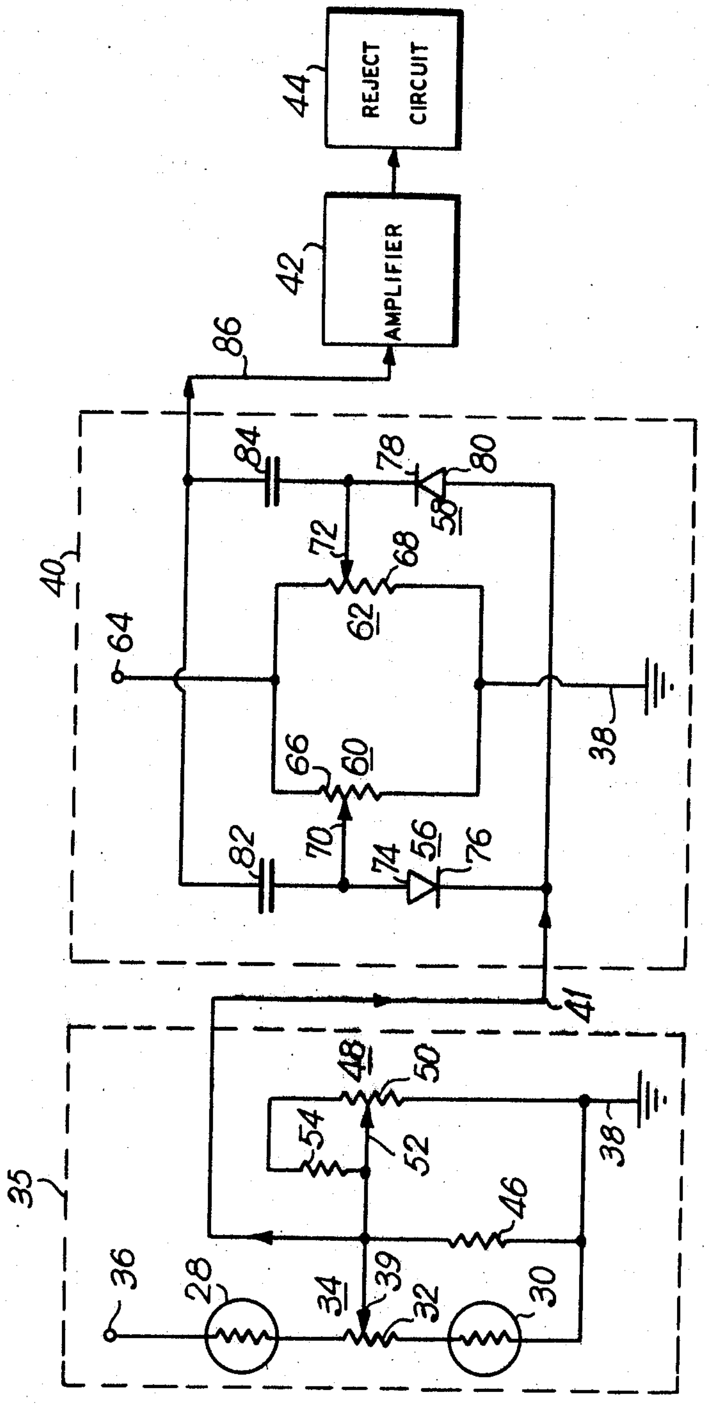
FIG. 3 is a schematic diagram showing the electrical circuitry which processes the electrical signals provided by the photosensitive means of the embodiment of FIGS. 1 and 2.

Referring to FIG. 3 photocells 28 and 30 are shown in schematic form as being connected to opposite ends of the resistor portion 32 of potentiometer 34 to comprise a photocell detection circuit 35. The series arrangement of photocell 28, resistor 32 and photocell 30 is connected across a source of D.C. potential shown by supply terminal 36 and ground terminal 38. The signal output of photocell detection arrangement 35 whose magnitude is a function of the voltage signals respectively generated by photocells 28 and 30 appears on wiper arm 39 of potentiometer 34 and is thereafter fed to threshold control circuit 40 by means of lead 41.

Threshold control circuit 40 is operative as hereinafter described to determine whether the signal input thereto lies within predetermined limit and to provide a threshold recognition signal in accordance therewith. The threshold signal provided by control circuit 40 is fed to amplifier circuit 42 which controllably amplifies the threshold signal and applies the amplified threshold signal to reject circuit 44. Reject circuit 44 may suitably comprise known control relays and an indication mechanism to indicate that the submitted document does not meet the predetermined standards.

Referring to FIG. 3, photocell detection circuit 35 includes a resistor 46 connected between arm 39 and ground terminal 38, potentiometer 48 having one end of its resistor portion 50 connected to ground terminal 38 and its wiper arm 52 connected to wiper arm 39. A fixed resistor 54 is connected between wiper arm 52 and the other end of resistor portion 50. The output of photocell detection circuit 35 is fed via lead 41 to the input of control circuit 40.

Control circuit 40 comprises a pair of back-biased diodes 56 and 58 which are referenced to reference voltages provided by potentiometers 60 and 62 respectively. Resistor portions 66 and 68 of potentiometers 60 and 62 respectively are connected between negative supply terminal 64 and ground terminal 38 so as to provide a selectively variable reference potential at wiper arms 70 and 72 respectively. Diode 56 has its anode 74 connected to wiper arm 70 and its cathode 76 to input lead 41 whereas diode 58 has its cathode 78 connected to wiper arm 72 and its anode 80 connected to input lead 41. Output coupling capacitors 82 and 84 are respectively connected at one end to anode 74 and cathode 78 and to output lead 86 at the other end to thereby couple the output of control circuit 40 to amplifier 42.

Before examining a particular bill to determine its denomination and its authenticity, it is necessary to calibrate photocell detector circuit 35 and control circuit 40 which may be accomplished in the following manner.

A bill which is known to be genuine is positioned on platform 25 as shown in FIG. 2 and wiper arm 39 is adjusted so that the ratio of the voltage on arm 39 to the supply voltage at supply terminal 36 is equal to the ratio of color content of the two colors in the bill under examination. As a point of example, assume that the bill under consideration is a U.S. dollar bill and that filter 14 passes only green light and that filter 16 blocks only green light while passing light of all other wavelengths to provide a white light.

Accordingly, photocells 28 and 30 detect the green and white color content of the area under consideration. If, for example, the ratio of the white to green color content is 1:1 then arm 38 is adjusted so that the voltage thereon is one half of the supply potential at terminal 36.

The arrangement of fixed resistor 54 and potentiometer 48 is operative to provide a suitable D.C. reference level for the signal appearing on arm 38, by selectively varying arm 52.

A bill whose condition presents the minimum acceptable white to green color ratio, at the area under examination, is then positioned on support 25, and wiper arm 70 is adjusted to vary the reference potential applied to anode 74 so that no current flows through diode 58. Then, a bill whose conditions presents the maximum acceptable white to green color ratio, at its area of interest is suitably positioned on platform 25, and wiper arm 72 is adjusted to vary the reference potential applied to cathode 78 so that no current flows through diode 58. Upon completion of the above calibration procedure for a particular denomination of paper currency, for example, the apparatus is in condition to examine bills of that denomination presented to it at platform 25.

Thus, when a bill is positioned on platform 25, a potential signal will appear on wiper arm 35 which represents the white to green color ratio of the area of the bill under examination. If the detected white to green color ratio falls within the predetermined limits as reflected by the settings of wiper arms 70 and 72, then no current will flow through either diodes 56 or 58, and hence control circuit 40 will have a zero output at lead 86 and reject circuit 44 will remain deactivated. If the detected white to green color ratio is less than the predetermined minimum limit, the signal provided at lead 41 will cause diode 56 to conduct causing a voltage signal to be produced across coupling capacitor 82 which is applied for amplification to amplifier 42 by lead 86 thereby actuating reject circuit 44 to provide a reject signal. If the detected white to green color ratio is greater than the predetermined maximum limit, the signal produced at lead 41 will cause diode 56 to conduct causing a voltage signal to be produced across coupling capacitors 84, which is amplified by amplifier 42, causing reject circuit 44 to produce a reject signal.

It is understood that although the description above pertains particularly to an area of a bill having green and white color content, the described embodiment of the present invention is equally suitable to detect the color ratio of varying shades of the same color by suitably choosing the appropriate filters.

Furthermore, although the description of the above embodiment of the present invention relates to the use of two sensing elements directed at one area under examination, it is understood that a multiplicity of color sensitive sensitive sensing elements may be used to examine other areas, either sequentially while using a single reject circuit such as reject circuit 44, or simultaneously sensing various areas of the bill by using a multiplicity of reject circuits. Accordingly, the ratio signals derived from the respective examined areas may in turn be compared with each other to provide a further resultant ratio signal, which can be applied to control circuit 40 to determine whether it lies within preselected limits. As a point of illustration, assume that there are four areas of interest in the bill i.e., areas A, B, C, and D. The color ratio for the respective areas may be derived as described above and the color ratio for area A may be compared with any one of the ratios for other areas B, C, D individually or in combination. Similarly, the color ratios for either B, C, or D may be compared with the color ratios for the remaining areas, either individually or in combination, thus providing a total of twenty-four checks when four areas are being examined. Further checks as to the genuineness of the area under examination may be achieved by comparing the shade of a particular color e.g. green, with the corresponding shade of green in any of the other areas. An important feature of the present invention is thus demonstrated in that the numerous combinations of measurements of color ratios in various areas of the bill under examination substantially reduces the possibility of a non-genuine document being found acceptable by the machine.

Moreover, the security and reliability of the embodiment of the present invention may be further enhanced by suitably varying the locations of the areas being examined and the number of color ratio measurements taken in order to guard against the possibility of a counterfeit document being found acceptable by the apparatus described.

What is claimed to be new and desired to be secured by U.S. Letters Patent is:

1. Document recognizing apparatus comprising, a light source for illuminating at least one area of said document, first optical filter means for passing light reflected from said one area of said document having only a preselected wave length while blocking light of all other wave lengths, second optical filter means for passing only light reflected from said one area of said document having all wave lengths other than said preselected wave length, first photocell means in optical alignment with said first filter means for providing a first signal representative of the light passing through said first filter means, second photocell means in optical alignment with said second filter means for providing a second signal representative of the light passing through said second filter means, comparison means for comparing said first and second signals to provide a third signal representative of the ratio of said second signal to said first signal, and means for providing a recognition signal indicating whether said third signal lies within preselected limits.

2. Document recognizing apparatus as defined in claim 1 including a source of reference potential having a pair of output terminals wherein said first photocell means comprises a first photocell having a pair of output terminals, and said second photocell means comprises a second photocell having a pair of output terminals, said first photocell having one of its output terminals connected to one of said potential source output terminals, said second photocell having one of its output terminals connected to the other of said potential source output terminals, and wherein said comparison means comprises potentiometer means having a resistor portion and a wiper arm with said resistor portion interconnecting the other of said first photocell output terminals and the other of said second photocell output terminals and a resistor connected between said wiper arm and the other of said potential source output terminals, said third signal being provided at said wiper arm.

3. Document recognizing apparatus as defined in claim 1 wherein said recognition signal means comprises indicator means, a first source of reference potential, a second source of reference potential, a first diode having its anode connected to said first source of reference potential, a second diode having its cathode connected to said second source of reference potential and its anode connected to the cathode of said first diode, means for applying said third signal to the junction of said first and second diodes, and signal coupling means respectively connecting the anode of said first diode and the cathode of said second diode to said indicator means to thereby provide a recognition signal indicating whether said third signal lies within preselected limits determined by said first and second sources of reference potential.

4. Document recognizing apparatus as defined in claim 1 wherein said recognition signal means comprise indicator means, a reference potential source having a pair of output terminals, first and second potentiometer means each having a resistor portion and a wiper arm, said first and second resistor portions being connected between said reference potential source output terminals, a first diode having its anode connected to said first wiper arm, a second diode having its cathode connected to said second wiper arm and its anode connected to the cathode of said first diode, means for applying said third signal to the junction of said first and second diodes, a first capacitor connected to said first wiper arm, a second capacitor interconnecting said second wiper arm and said first capacitor, and means connecting the junction of said first and second capacitors to said indicator means to thereby provide a recognition signal indicating whether said third signal lies within preselected limits determined by the setting of said first and second potentiometer wiper arms.

5. Document recognizing apparatus comprising light source means for illuminating a plurality of areas of said document, a plurality of first optical filter means for passing only light having a preselected wave length, a plurality of second optical filter means for passing light having all wave lengths other than said preselected wave length, at least one of said first optical filter means and at least one of said second optical filter means being disposed to receive only light reflected from each of said areas of said document, a photocell means in optical alignment with each of said first filter means for providing a first signal representative of the light passing through each of said first filter means, a second photocell means in optical alignment with each of said second filter means for providing a second signal representative of the light passing through each of said second filter means, a comparison means associated with each of said areas of said object for determining the ratio between said first and second signals to thereby provide a signal representing said ratio, means for comparing one of said ratio signals associated with one area of said document, with a second of said ratio signals associated with another area of said document to provide a third ratio signal representative of the ratio of said first ratio signal to said second ratio signal, and means for providing a recognition signal indicating whether said third ratio signal lies within preselected limits.

References Cited

UNITED STATES PATENTS

| | | | |
|---|---|---|---|
| 3,122,227 | 2/1964 | Bookout et al. | |
| 3,206,022 | 9/1965 | Roberts et al. | 250—226 |
| 3,360,653 | 12/1967 | Phares. | |

JEWELL H. PEDERSEN, Primary Examiner

ORVILLE B. CHEW II, Assistant Examiner

U.S. Cl. X.R.

250—219, 226